US012519224B2

(12) United States Patent
Shao et al.

(10) Patent No.: US 12,519,224 B2
(45) Date of Patent: Jan. 6, 2026

(54) TRANSMISSION DEVICE FOR BASE STATION ANTENNA AND BASE STATION ANTENNA

(71) Applicant: Outdoor Wireless Networks LLC, Claremont, NC (US)

(72) Inventors: Shuguang Shao, Jiangsu (CN); Yiding Wang, Jiangsu (CN); Puliang Tang, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 348 days.

(21) Appl. No.: 18/304,803

(22) Filed: Apr. 21, 2023

(65) Prior Publication Data

US 2023/0361465 A1 Nov. 9, 2023

(30) Foreign Application Priority Data

May 6, 2022 (CN) ........................ 202221069449.X

(51) Int. Cl.
*H01Q 3/00* (2006.01)
*H01Q 1/46* (2006.01)
*H01Q 3/32* (2006.01)

(52) U.S. Cl.
CPC ................. *H01Q 3/32* (2013.01); *H01Q 1/46* (2013.01)

(58) Field of Classification Search
CPC .. H01Q 3/32; H01Q 1/46; H01Q 5/10; H01Q 5/15; H01Q 3/36
See application file for complete search history.

(56) References Cited

U.S. PATENT DOCUMENTS

2016/0134007 A1* 5/2016 Ding .................... H01Q 1/1264 343/880
2020/0220260 A1* 7/2020 Li ............................ H01Q 3/08

FOREIGN PATENT DOCUMENTS

CN 105633579 A * 6/2016 ............... H01Q 3/32
CN 215955446 U * 3/2022 ................ H01P 1/18

* cited by examiner

*Primary Examiner* — Zakaria Elahmadi
(74) *Attorney, Agent, or Firm* — Myers Bigel, P.A.

(57) ABSTRACT

A transmission device for a base station antenna includes a motor, a screw driven by the motor, a transmission shaft, and a linkage system. The linkage system is connected with the screw via the transmission shaft, so that the screw drives the linkage system via the transmission shaft. The linkage system includes: a worm driven by the transmission shaft, a worm gear meshed with the worm, at least one spur gear disposed on a same connecting shaft as the worm gear, and at least one connecting rod engagement element. The spur gear and the worm gear are fixed relative to each other. The connecting rod engagement element has a rack meshed with the spur gear, so that the worm drives the worm gear to rotate with the spur gear, and the spur gear drives the connecting rod engagement element via the rack to move in an axial direction of the transmission shaft.

20 Claims, 6 Drawing Sheets

TRANSMISSION DEVICE FOR BASE STATION ANTENNA AND BASE STATION ANTENNA

RELATED APPLICATION

The present application claims priority from and the benefit of Chinese Patent Application No. 202221069449.X, filed May 6, 2022, the disclosure of which is hereby incorporated herein by reference in full.

FIELD OF THE INVENTION

The present disclosure generally relates to a communication system. More particularly, the present disclosure relates to a transmission device that is capable of adjusting the remote electrical tilt of a phase shifter of a base station antenna (particularly, a high-band wireless antenna). In addition, the present disclosure relates to a base station antenna.

BACKGROUND OF THE INVENTION

A cellular communication system is used to provide wireless communication to stationary and mobile users. The cellular communication system may include a plurality of base stations, and each base station provides a wireless cellular service for a designated coverage area (generally referred to as a "cell"). Each base station may include one or more base station antennas, and the base station antenna is used to transmit radio frequency ("RF") signals to a user located in a cell served by the base station and receive RF signals from the user. The base station antenna is a directional device that can converge RF energy transmitted in certain directions or received from certain directions.

A modern base station antenna usually includes two, three or more linear (or planar) arrays of radiating elements, where each linear array has an electronically adjustable down tilt angle. The linear array usually includes a cross-polarized radiating element, and is provided with a separate phase shifter for electronically adjusting the down tilt angle of antenna beams for each polarization, so that the antenna can include twice the phase shifters of the linear array. A remote electrical tilt ("RET") actuator and an associated transmission device may be provided in the antenna to adjust the phase shifter.

With the development of communication technology, high-band wireless antennas have emerged. In order to adjust the remote RET of the phase shifter of such high-band wireless antennas, a transmission device with higher precision is required. For example, it is desirable to control the adjustment precision of the transmission device within the range of −0.5 mm to +0.5 mm. The adjustment precision of the transmission device is affected to a certain extent by the manufacturing tolerance and/or the assembly tolerance caused by the manufacturing tolerance, so it is necessary to minimize the manufacturing tolerance and/or assembly tolerance of the transmission device.

SUMMARY OF THE INVENTION

An object of the present disclosure is to provide a transmission device for a base station antenna, which at least is capable of improving the adjustment precision thereof by reducing the assembly tolerance caused by the manufacturing tolerance.

A first aspect of the present disclosure relates to a transmission device for a base station antenna. The transmission device includes a motor, a screw driven by the motor, a transmission shaft, and a linkage system, the linkage system is connected with the screw via the transmission shaft, so that the screw is capable of driving the linkage system via the transmission shaft, and the linkage system includes: a worm driven by the transmission shaft, a worm gear meshed with the worm, at least one spur gear disposed on a same connecting shaft as the worm gear, and at least one connecting rod engagement element, the spur gear and the worm gear being fixedly disposed relative to each other and the connecting rod engagement element having a rack meshed with the spur gear, so that the worm is capable of driving the worm gear to rotate with the spur gear, and the spur gear drives the connecting rod engagement element via the rack to move in an axial direction of the transmission shaft; where the worm has a shaft bore for connection with the transmission shaft, an inner surface of the shaft bore has a polygonal structure, the transmission shaft at least partially has a polygonal portion for embedding into the shaft bore, and the polygonal portion is configured to mate with the polygonal structure of the inner surface of the shaft bore to be able to define the worm in its zero position when the transmission device is assembled.

According to an embodiment of the present disclosure, the connecting rod engagement element includes a restriction slot configured to receive a restriction element when the transmission device is assembled, so as to position the connecting rod engagement element in its zero position.

According to an embodiment of the present disclosure, a diameter ratio of the worm gear to the spur gear is greater than 1.

According to an embodiment of the present disclosure, the shaft bore of the worm has a decagonal inner surface, and the polygonal portion of the transmission shaft has a decagonal outer surface that mates with the inner surface of the shaft bore of the worm.

According to an embodiment of the present disclosure, the polygonal portion extends over an entire axial length of the transmission shaft.

According to an embodiment of the present disclosure, the restriction slot extends transversely to a movement direction of the connecting rod engagement element.

According to an embodiment of the present disclosure, each connecting rod engagement element comprises two connecting rod engagement half bodies, and the rack is provided between the two connecting rod engagement half bodies and connects the two connecting rod engagement half bodies.

According to an embodiment of the present disclosure, each connecting rod engagement half body has two feet extending in the movement direction of the connecting rod engagement element, and the two feet extend away from each other from a region in which the rack is located.

According to an embodiment of the present disclosure, the restriction slot is configured on at least one of the two feet.

According to an embodiment of the present disclosure, in an assembly position of the connecting rod engagement element, the restriction slot is configured in a same position of a foot on a same side of each of all the connecting rod engagement half bodies.

According to an embodiment of the present disclosure, the transmission device includes a plurality of connecting rod engagement elements configured to move synchronously with each other in the axial direction of the transmission shaft under driving of the spur gear.

According to an embodiment of the present disclosure, the diameter ratio of the worm gear to the spur gear is 1.5.

According to an embodiment of the present disclosure, the transmission device has even number of spur gears, and the even number of spur gears are mirrored on both sides of the worm gear with respect to the worm gear.

According to an embodiment of the present disclosure, the connecting shaft has a polygonal cross-section, and inner surfaces of shaft bores of the worm gear and the spur gear for receiving the connecting shaft each have a polygonal structure that mates with the cross-section of the connecting shaft, so that the spur gear rotates synchronously with the worm gear via the connecting shaft.

A second aspect of the present disclosure relates to a transmission device for a base station antenna. The transmission device includes a motor, a screw driven by the motor, a transmission shaft, and a linkage system, the linkage system is connected with the screw via the transmission shaft, so that the screw is capable of driving the linkage system via the transmission shaft, and the linkage system includes: a worm driven by the transmission shaft, a worm gear meshed with the worm, a plurality of spur gears disposed on a same connecting shaft as the worm gear, and a plurality of connecting rod engagement elements, the spur gears and the worm gear being fixedly disposed relative to each other and each of the connecting rod engagement elements having a rack meshed with a respective spur gear, so that the worm is capable of driving the worm gear to rotate with the spur gears, and the spur gears drive the connecting rod engagement elements via the rack to move in an axial direction of the transmission shaft; where each connecting rod engagement element includes a restriction slot configured to receive a restriction element when the transmission device is assembled, so as to position the connecting rod engagement element in its zero position.

According to an embodiment of the present disclosure, each connecting rod engagement element includes two connecting rod engagement half bodies, the rack is provided between the two connecting rod engagement half bodies and connects the two connecting rod engagement half bodies, each connecting rod engagement half body has two feet extending along a movement direction of the connecting rod engagement element, and the two feet extend away from each other from a region in which the rack is located.

According to an embodiment of the present disclosure, in an assembly position of the connecting rod engagement element, the restriction slot is configured in a same position of a foot on a same side of each of all the connecting rod engagement half bodies.

According to an embodiment of the present disclosure, the worm has a shaft bore for connection with the transmission shaft, an inner surface of the shaft bore has a polygonal structure, the transmission shaft at least partially has a polygonal portion for embedding into the shaft bore, and the polygonal portion is configured to mate with the polygonal structure of the inner surface of the shaft bore to be able to define the worm in its zero position when the transmission device is assembled.

According to an embodiment of the present disclosure, a diameter ratio of the worm gear to the spur gear is greater than 1, and in particular, the diameter ratio of the worm gear to the spur gear is 1.5.

A third aspect of the present disclosure relates to a base station antenna. The base station antenna includes the transmission device according to the first aspect or the second aspect of the present disclosure.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

BRIEF DESCRIPTION OF THE DRAWINGS

A plurality of aspects of the present disclosure will be better understood after reading the following specific embodiments with reference to the attached drawings. Among the attached drawings.

It should be understood that in all the attached drawings, the same symbols denote the same elements. In the attached drawings, for clarity, the size of certain feature is not drawn to scale as it may change.

DETAILED DESCRIPTION OF SPECIFIC EMBODIMENTS

Figure 1:
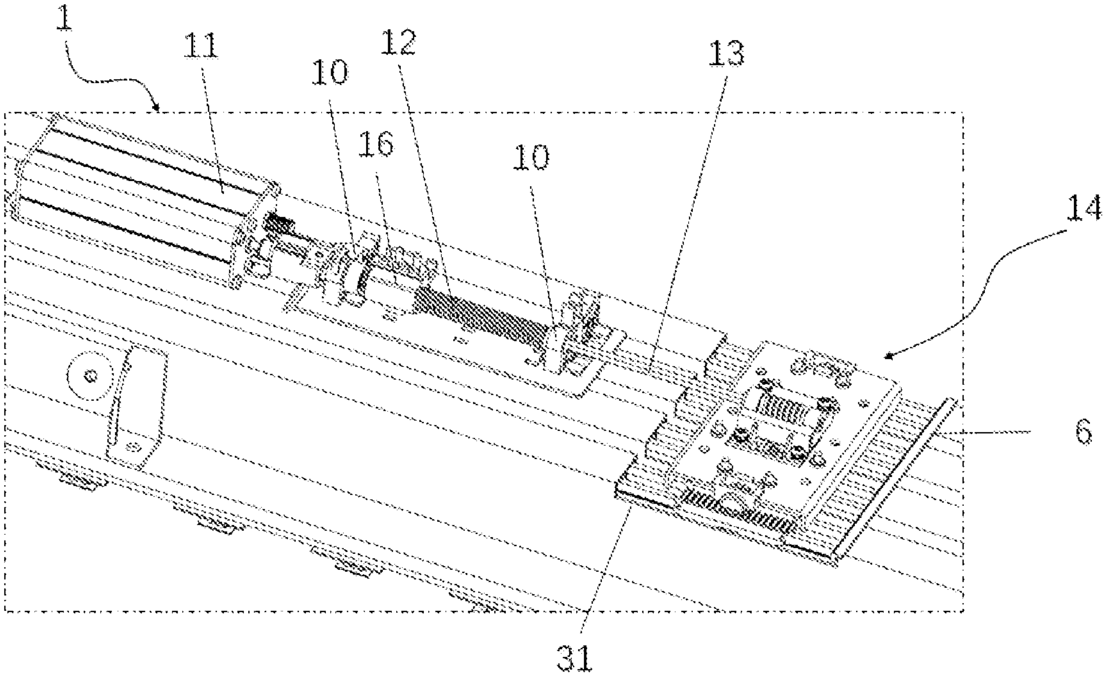
FIG. 1 is a schematic perspective view of a transmission device according to an embodiment of the present disclosure mounted on a base station antenna.

The present disclosure will be described below with reference to the attached drawings, and the attached drawings illustrate certain embodiments of the present disclosure. However, it should be understood that the present disclosure may be presented in many different ways and is not limited to the embodiments described below; in fact, the embodiments described below are intended to make the content of the present disclosure more complete and to fully explain the protection scope of the present disclosure to those skilled in the art. It should also be understood that the examples disclosed in the present disclosure may be combined in various ways so as to provide more additional examples.

It should be understood that the words in the Specification are only used to describe specific embodiments and are not intended to limit the present disclosure. Unless otherwise defined, all terms (including technical terms and scientific terms) used in the Specification have the meanings commonly understood by those skilled in the art. For brevity and/or clarity, well-known functions or structures may not be further described in detail.

The singular forms "a", "an", "the" and "this" used in the Specification all include plural forms unless clearly indicated. The words "include", "contain" and "have" used in the Specification indicate the presence of the claimed features, but do not exclude the presence of one or a plurality of other features. The word "and/or" used in the Specification includes any or all combinations of one or a plurality of the related listed items.

In the Specification, when it is described that an element is "on" another element, "attached" to another element, "connected" to another element, "coupled" with another element, or "in contact with" another element, etc., the element may be directly on another element, attached to another element, connected to another element, coupled with another element, or in contact with another element, or an intermediate element may be present.

In the Specification, the terms "first", "second", "third", etc. are only used for convenience of description and are not intended for limitation. Any technical features represented by "first", "second", "third", etc. are interchangeable.

In the Specification, terms expressing spatial relations such as "upper", "lower", "front", "rear", "top", and "bottom" may describe the relation between one feature and another feature in the attached drawings. It should be understood that, in addition to the locations shown in the attached drawings, the words expressing spatial relations further include different locations of a device in use or operation. For example, when a device in the attached drawings is turned upside down, the features originally described as being "below" other features now can be described as being "above" the other features". The device may also be oriented by other means (rotated by 90 degrees or at other locations), and at this time, a relative spatial relation will be explained accordingly.

The present disclosure relates to a transmission device for a base station antenna, and in particular, to a transmission device for high-band wireless antennas. The transmission device of the present disclosure may be used to adjust the RET of a phase shifter of a base station antenna. The transmission device of the present disclosure is capable of at least improving the adjustment precision thereof by reducing the assembly tolerance caused by the manufacturing tolerance. The present disclosure further relates to a base station antenna.

FIG. 1 shows a transmission device 1 according to an embodiment of the present disclosure mounted on a base station antenna. The transmission device 1 may include a motor 11, a screw 12 driven by the motor, a transmission shaft 13, and a linkage system 14. The screw 12 is connected with an output shaft of the motor 11, and the linkage system 14 is connected with the screw 12 via the transmission shaft 13, so that the screw 12 is capable of driving the transmission shaft 13 and driving the linkage system 14 via the transmission shaft 13. The linkage system 14 may be configured with a connecting rod 4 (see FIG. 7) for driving an adjusting element of a phase shifter, thereby adjusting an inclination angle of the phase shifter by driving the connecting rod 4. The screw 12 may be rotatably supported by support elements 10 located at both ends thereof. A stop nut 16 may be provided on the screw 12. The stop nut 16 can move back and forth along an axial direction of the screw 12 when the screw 12 is rotated until it abuts against any of the support elements 10 located at both ends of the screw 12. When the stop nut 16 abuts against any of the support elements 10, the screw 12 will no longer continue to rotate along its previous rotation direction.

Figure 2:
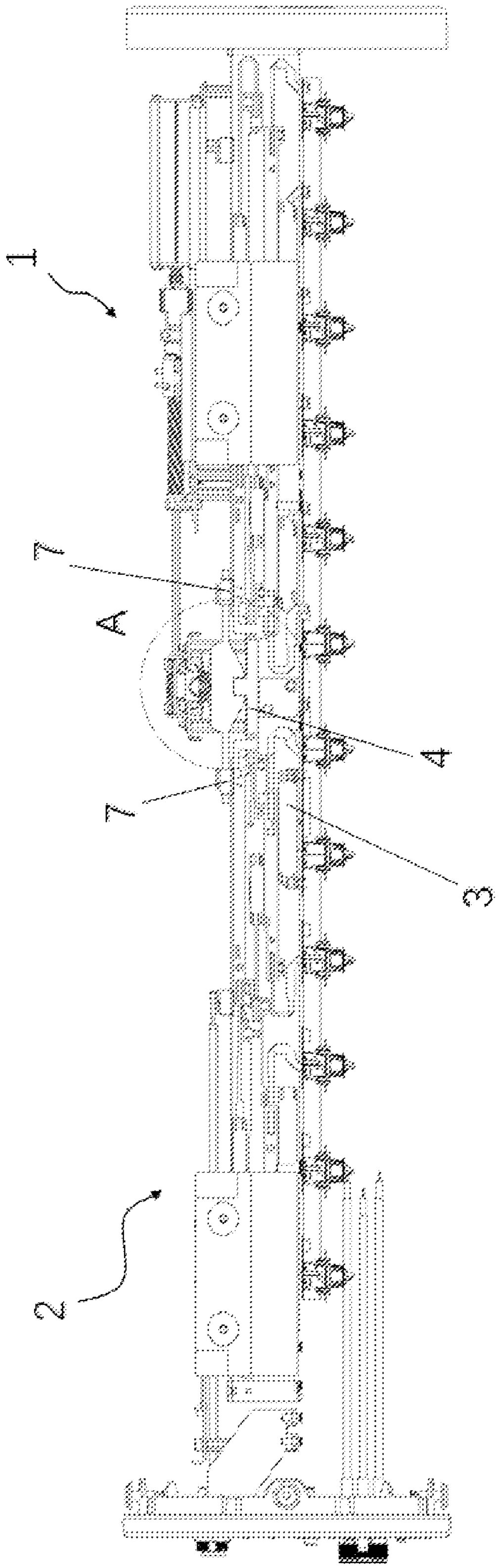
FIG. 2 is a schematic side view of a base station antenna with the transmission device shown in FIG. 1 mounted according to an embodiment of the present disclosure.
Figure 3:
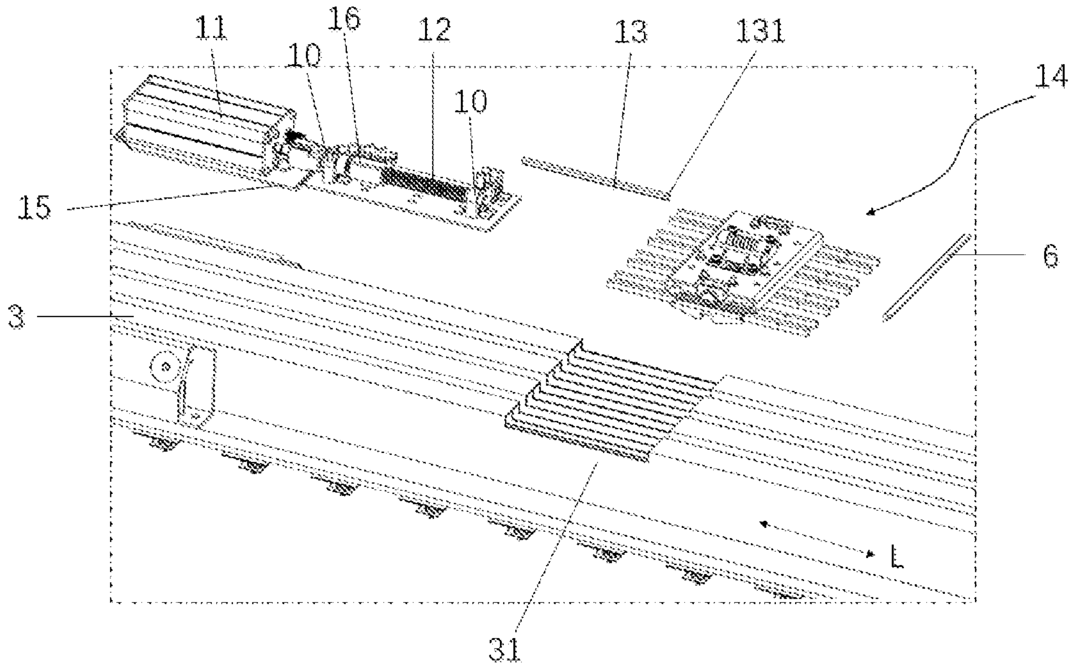
FIG. 3 is a schematic exploded view of the transmission device shown in FIG. 1.

The transmission device 1 may be mounted on a phase shifter assembly 3 of a base station antenna 2 to drive the phase shifter, as shown in FIG. 2. In an embodiment according to the present disclosure, the motor 11, the screw 12, the stop nut 16, and the support elements 10 for supporting the screw 12 may be mounted on a housing of the phase shifter assembly 3, while the linkage system 14 may be provided at a housing opening 31 of the phase shifter assembly 3. In an embodiment according to the present disclosure, the motor 11 and the support elements 10 for supporting the screw 12 may be fixed on a support plate 15, while the support plate 15 may be fixed on the housing of the phase shifter assembly 3 of the base station antenna 2 (as shown in FIG. 3). In the state in which the transmission device 1 is mounted on the phase shifter assembly 3, the screw 12 and the transmission shaft 13 extend parallel to a longitudinal direction L of the phase shifter assembly.

Figure 4:
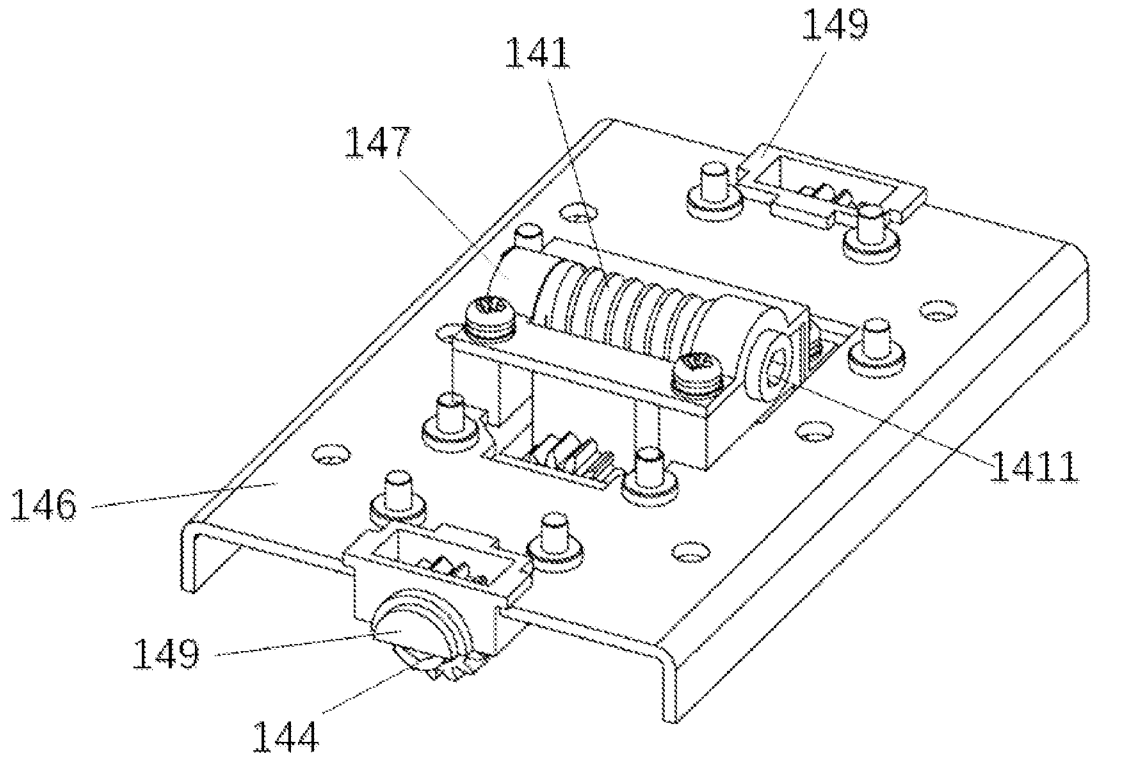
FIG. 4 is a schematic perspective view of a portion of an assembly of a linkage system of the transmission device shown in FIG. 1 when viewed from above.
Figure 5:
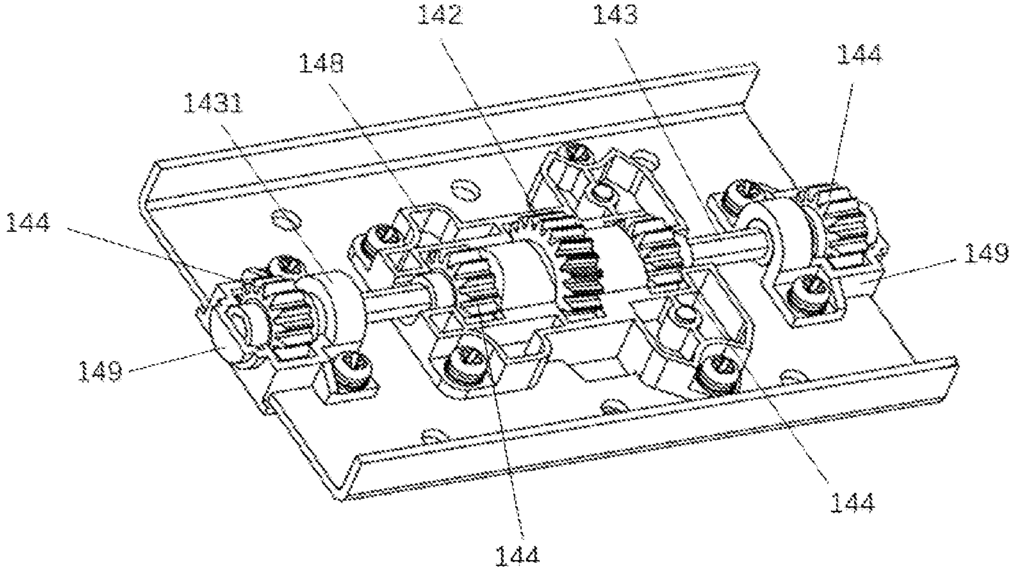
FIG. 5 is a schematic perspective view of a portion of the assembly of the linkage system shown in FIG. 4 when viewed from below.
Figure 6:
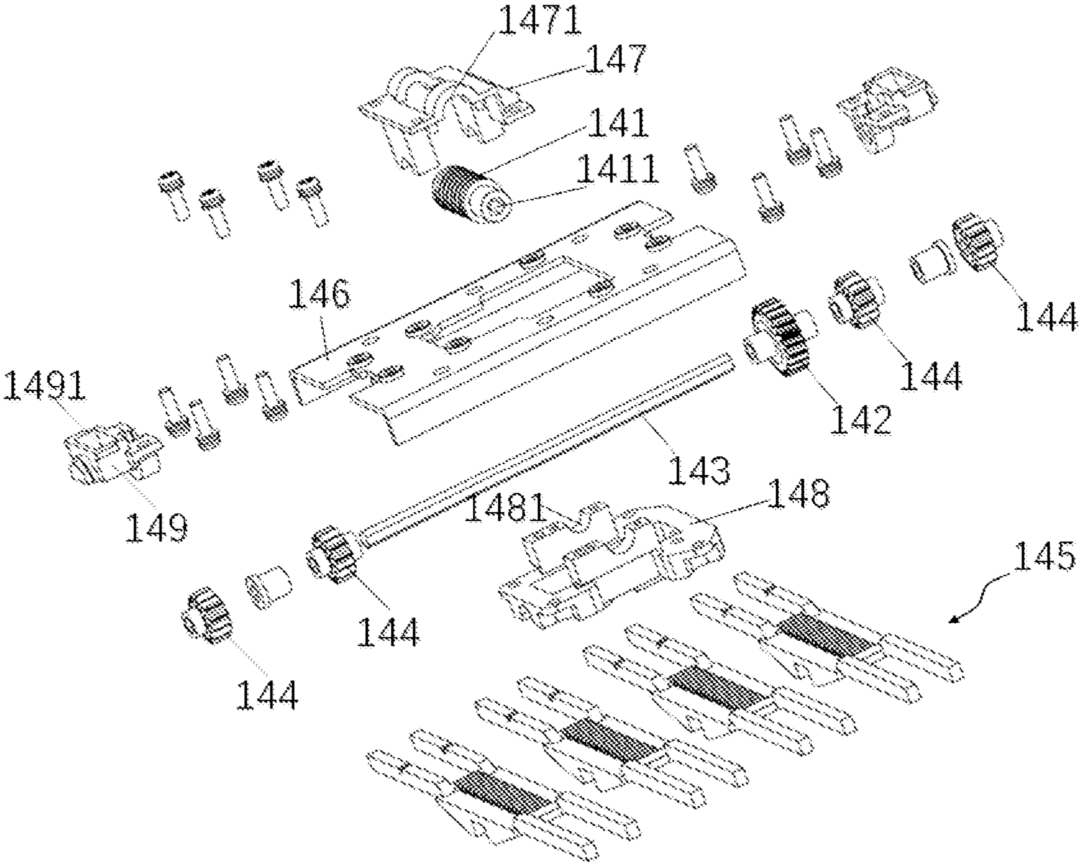
FIG. 6 is a schematic exploded view of a linkage system of the transmission device shown in FIG. 1.

Next, a specific construction of the linkage system 14 according to the present disclosure is described in detail first with reference to FIG. 4 to FIG. 6.

In an embodiment according to the present disclosure, the linkage system 14 may include: a worm 141 driven by the transmission shaft 13, a worm gear 142 meshed with the worm 141, one or more spur gears 144 fixedly disposed on a same connecting shaft 143 as the worm gear 142, and one or more connecting rod engagement elements 145 driven by the spur gear 144. The connecting rod engagement element 145 may have a rack 1451 (see FIG. 7) meshed with the teeth of the spur gear 144, so that the spur gear 144 can drive, via the rack 1451, the connecting rod engagement element 145 to move in the axial direction of the transmission shaft 13 or otherwise in the longitudinal direction L of the phase shifter assembly 3, when the worm 141 drives the worm gear 142 and the spur gear 144 to rotate together. The connecting rod engagement element 145 may engage with the connecting rod 4 for driving the adjusting element of the phase shifter assembly 3 of the base station antenna 2 (see FIGS. 2 and 8), thereby adjusting the inclination angle of the phase shifter in the phase shifter assembly 3 by driving the connecting rod 4.

In an embodiment according to the present disclosure, the linkage system 14 may have even number of spur gears 144, and the spur gears 144 may be mirrored on both sides of the worm gear 142 with respect to the worm gear 142. For example, the linkage system 14 may include four spur gears 144 that are mirrored on both sides of the worm gear 142 with respect to the worm gear 142. Correspondingly, the linkage system 14 may include four connecting rod engagement elements 145, and each spur gear 144 may mesh with one connecting rod engagement element 145 and thus drive the connecting rod engagement element 145.

In an embodiment according to the present disclosure, as shown in FIG. 6, to assemble the worm 141, the worm gear 142, the connecting shaft 143, and the spur gear 144, the linkage system 14 may further include a mounting plate 146, a worm mount 147, a worm gear mount 148, and a connecting shaft mount 149. In the assembled state of the linkage system 14, an axis of rotation of the worm 141 may be located above the mounting plate 146, while axes of rotation of the worm gear 142 and the spur gear 144 may be located below the mounting plate 146 and perpendicular to the axis of rotation of the worm 141. In this way, in the state in which the transmission device 1 is mounted on the phase shifter assembly 3, the axis of rotation of the worm 141 is coaxial to the axis of rotation of the transmission shaft 13 and thus parallel to the longitudinal direction L of the phase shifter assembly, while the axes of rotation of the worm gear 142 and the spur gear 144 extend in a direction perpendicular to the axial direction of the transmission shaft 13 and thus perpendicular to the longitudinal direction L of the phase shifter assembly 3.

The worm mount 147 and the worm gear mount 148 may include worm support portions 1471 and 1481 for supporting both ends of the worm 141, respectively. The worm mount 147 may be securely connected with the worm support portion 1481 of the worm gear mount 148 through corresponding fastening elements (such as bolts or screws), so that the worm support portion 1471 of the worm mount 147 and the corresponding worm support portion 1481 of the worm gear mount 148 form a worm support space for rotatably supporting the worm 141.

The worm gear mount 148 may be fixed to the underside of the mounting plate 146 by respective fastening elements (such as bolts or screws). However, the worm support portion 1481 of the worm gear mount 148 may support the worm 141 by extending to the upper side of the mounting plate 146 via an opening disposed in the mounting plate 146 (as shown in FIG. 4). Furthermore, the worm gear mount 148 may also include a worm gear receiving portion for receiving the worm gear 142 and a gear receiving portion for receiving the spur gear 144 (as shown in FIG. 5). The worm gear 142 may be at least partially received in the worm gear receiving portion of the worm gear mount 148, while the spur gear 144 may be at least partially received in the gear receiving portion of the worm gear mount 148.

Each connecting shaft mount 149 may include a support portion 1431 for supporting the connecting shaft 143 and may be fixed to the underside of the mounting plate 146 by corresponding fastening elements (such as bolts or screws) (as shown in FIG. 5). In this way, both ends of the connecting shaft 143 may be rotatably mounted on the underside of the mounting plate 146 by one connecting shaft mount 149, respectively. In addition, in some embodiments according to the present disclosure, each connecting shaft mount 149 may further include a gear receiving portion 1491 for receiving one of the spur gears 144. However, the gear receiving portion 1491 is not required.

In an embodiment according to the present disclosure, referring to FIGS. 5 and 6, in order to enable the spur gear 144 to drive the worm gear 142 via the connecting shaft 143 to rotate synchronously therewith, the connecting shaft 143 may have a non-circular (e.g., polygonal, oval, elliptical, etc.) cross-section, and inner surfaces of shaft bores of the worm gear 142 and the spur gear 144 configured to receive the connecting shaft 143 each have a non-circular structure that mates with the non-circular cross-section of the connecting shaft 143. As such, the mating of the non-circular inner surface of the shaft bore of the worm gear 142 with the non-circular outer surface of the connecting shaft 143 and the mating of the non-circular outer surface of the connecting shaft 143 and the non-circular inner surface of the shaft bore of the spur gear 144 enable rotational movement of the worm gear 142 to be passed to the spur gear 144 via the connecting shaft 143 with high precision without adverse relative rotation between the worm gear 142, the connecting shaft 143 and the spur gear 14.

Next, referring to FIG. 7, a specific structure of the connecting rod engagement element 145 will be described in detail. In an embodiment according to the present disclosure, the connecting rod engagement element 145 may be configured as an elongated element extending along the axial direction of the transmission shaft 13. In the embodiment shown in FIG. 7, the connecting rod engagement element 145 may include two connecting rod engagement half bodies 1452, and each connecting rod engagement half body 1452 may be used to drive one phase shifter. Each connecting rod engagement half body 1452 may include a component 1454 for engaging with a connecting rod 4. The component 1454 for engaging with the connecting rod may be located on the underside of each connecting rod engagement half body 1452. The component 1454 for engaging with the connecting rod may be any suitable component in the technical field. In the embodiment shown in FIGS. 7 and 8, the component 1454 for engaging with the connecting rod may include a cutout 1455 for receiving a protrusion 5 of the connecting rod 4. When the protrusion 5 of the connecting rod 4 is received in the cutout 1455, the connecting rod engagement element 145 may drive the connecting rod 4 to move therewith, thereby driving the connecting rod 4 to adjust the inclination angle of the phase shifter in the phase shifter assembly 3.

The rack 1451 may be disposed between two connecting rod engagement half bodies 1452 of each connecting rod engagement element 145 and connect the two connecting rod engagement half bodies 1452. A plurality of teeth of the rack 1451 may be distributed along the axial direction of the transmission shaft 13, and each tooth may extend along a direction perpendicular to the axial direction of the transmission shaft 13. By connecting the two connecting rod engagement half bodies 1452 by means of the rack 1451, it can advantageously improve the ability of the transmission device 1 of the present disclosure to drive a plurality of phase shifters simultaneously. For example, in an embodiment according to the present disclosure, the linkage system 14 may include four connecting rod engagement elements 145 having the configuration shown in FIG. 7. Therefore, the transmission device 1 according to the present disclosure can drive eight phase shifters with increased synchronization. Certainly, the present disclosure is not limited thereto. Depending on actual needs, the linkage system 14 may include more or fewer number of connecting rod engagement elements 145, so that the transmission device 1 can drive more or less number of phase shifters synchronously.

In an embodiment according to the present disclosure, each connecting rod engagement half body 1452 may also have two feet 1453 extending along the axial direction of the transmission shaft 13, and the two feet 1453 may extend away from each other from a region in which the rack 1451 is located. In order to enable the connecting rod engagement element 145 to move more stably in the axial direction of the transmission shaft 13, one or more guides 7 for guiding the feet 1453 may be provided. As shown in FIG. 2, in an embodiment according to the present disclosure, two guides 7 may be respectively provided on both sides of the housing opening 31 in the housing of the phase shifter assembly 3. The two feet 1453 of each connecting rod engagement half body 1452 may be respectively received in a corresponding guide 7, so as to ensure stable linear movement of the connecting rod engagement element 145 via the guide 7 and thus improve the adjustment accuracy of the transmission device 1.

In order to improve the adjustment accuracy of the transmission device 1 by reducing the assembly tolerance caused by the manufacturing tolerance of the transmission device 1, in an embodiment according to the present disclosure, as shown more clearly in FIGS. 4 and 6, the worm 141 may be configured to have a shaft bore 1411 for connecting with the transmission shaft 13, and an inner surface of the shaft bore 1411 may have a polygonal structure (for example, square, pentagonal, hexagonal, heptagonal, octagonal, decagonal, etc.). Correspondingly, the transmission shaft 13 may have a polygonal portion 131 for embedding into the shaft bore 1411, and the polygonal portion 131 is configured to mate with the polygonal structure of the inner surface of the shaft bore 1411. When the worm 141 is in the zero position, an outer surface of the polygonal portion 131 of the transmission shaft 13 may mate with the inner surface of the shaft bore 1411 of the worm 141 having the polygonal structure to prevent the worm 141 from rotating and define the worm 141 in its zero position.

When the transmission device 1 is assembled, the worm 141 may first be mounted into the linkage system 14 and the assembly tolerance may be compensated for by rotating the worm 141 clockwise or counterclockwise while the assembly tolerance of the transmission device 1 is considered, thereby adjusting the worm 141 to an actual zero position in which the assembly tolerance has been compensated for. After determining the actual zero position of the worm 141, the polygonal portion 131 of the transmission shaft 13 may be embedded into the shaft bore 1411 of the worm 141 having the polygonal inner surface, so that the transmission shaft 13 can position the worm 141 in the actual zero position in which the assembly tolerance has been compensated for.

By means of the mating of the polygonal structure of the inner surface of the shaft bore 1411 of the worm 141 with the polygonal portion 131 of the transmission shaft 13, the transmission device 1 according to the present disclosure can compensate for the manufacturing tolerance of the various components of the transmission device 1 and the assembly tolerance of the transmission device 1 during assembly, thereby accurately positioning the worm 141 of the transmission device 1 in the actual zero position and thus improving the adjustment accuracy of the transmission device 1. Positioning accuracy of positioning the worm 141 in its zero position is related to the number of sides of the polygonal structure of the inner surface of the shaft bore 1411. Those skilled in the art can understand that the more the number of sides of the polygon, the better the precise positioning of the worm 141, but the weaker the positioning ability for the worm 141 at the same time. In one embodiment according to the present disclosure, the shaft bore 1411 of the worm 141 has a decagonal inner surface, and the polygonal portion 131 of the transmission shaft 13 has a decagonal outer surface that mates with the inner surface of the shaft bore 1411 of the worm 141, thereby being able to securely position the worm 141 while well meeting the adjustment accuracy requirements of the transmission device 1.

Figure 7:
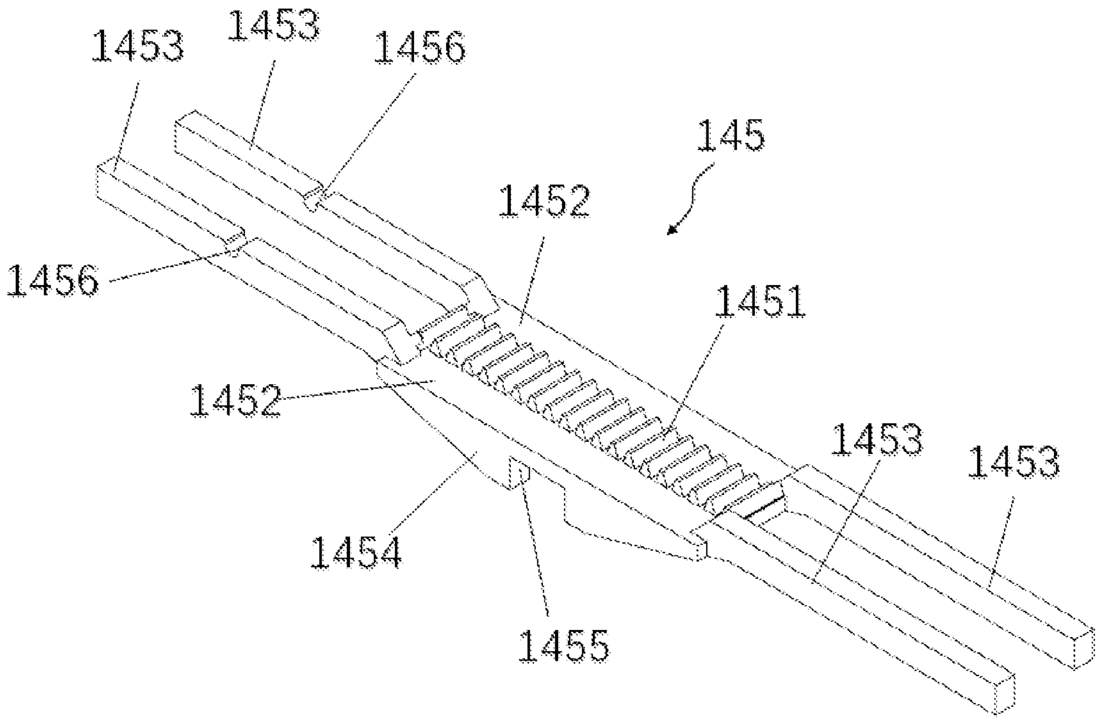
FIG. 7 is a schematic perspective view of a connecting rod engagement element of a linkage system of the transmission device shown in FIG. 1.
Figure 8:
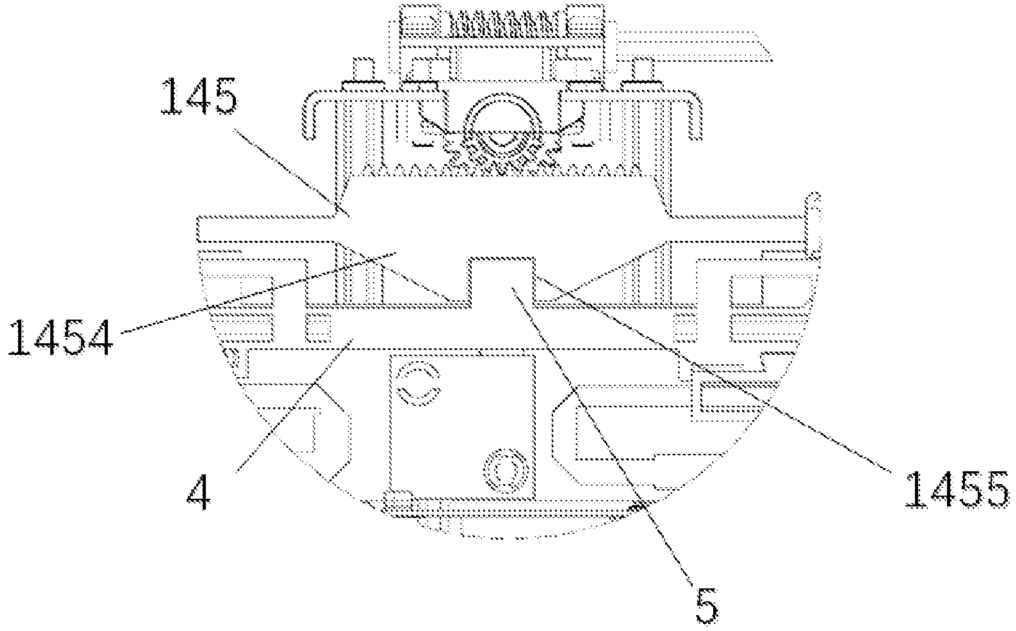
FIG. 8 is an enlarged view of a portion A shown in FIG. 2, which shows engagement between a connecting rod engagement element and a connecting rod of a phase shifter of a base station antenna.

In an embodiment according to the present disclosure, in order to further improve the adjustment accuracy of the transmission device 1 by reducing the assembly tolerance caused by the manufacturing tolerance of the transmission device 1, as shown in FIG. 7, the connecting rod engagement element 145 may include a restriction slot 1456. The restriction slot 1456 is configured to receive a restriction element 6 (see FIGS. 1 and 3) when the transmission device 1 is assembled, so as to position the connecting rod engagement element 145 in its zero position. The restriction slot 1456 extends transversely to a movement direction of the connecting rod engagement element 145. In an embodiment according to the present disclosure, the restriction slot is configured on at least one of the two feet 1453 of the connecting rod engagement half body 1452. In order to be able to simultaneously position a plurality of connecting rod engagement elements 145 of the transmission device 1 having the plurality of connecting rod engagement elements 145 in its zero position, in an embodiment according to the present disclosure, the restriction slot 1456 may be configured in a same position of a foot 1453 on a same side of each of all the connecting rod engagement elements 145 (as shown in FIGS. 3 and 6). In addition, the restriction element 6 may be configured as a long bar or rod to simultaneously position the plurality of connecting rod engagement elements 145. In an embodiment according to the present disclosure, the length of the restriction element 6 may be greater than or equal to the total distribution width of all the connecting rod engagement elements 145 in the longitudinal direction L transverse to the phase shifter assembly 3. When the transmission device 1 is assembled, the restriction element 6 may be provided in the restriction slots 1456 of all the connecting rod engagement elements 145, so that all the connecting rod engagement elements 145 can be adjusted simultaneously by moving the restriction element 6, and all the connecting rod engagement elements 145 are precisely positioned in their zero positions. After the transmission device 1 is mounted, the restriction element 6 may be removed to enable the connecting rod engagement element 145 to move.

Figure 9:
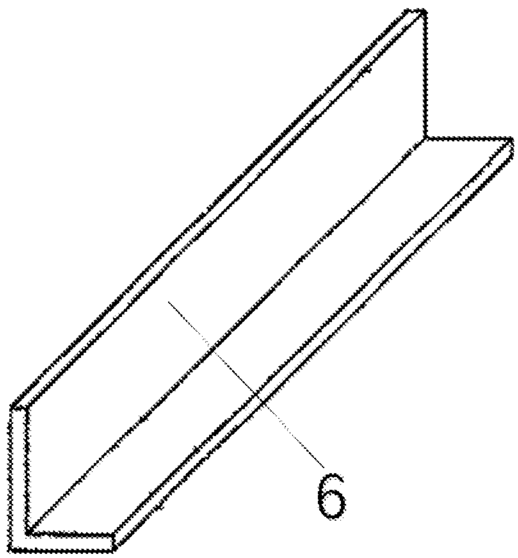
FIG. 9 shows a limit element according to one embodiment of the present disclosure.

In an embodiment according to the present disclosure, referring to FIGS. 1, 3 and 9, the restriction element 6 may have a generally L-shaped cross-section. When the transmission device 1 is assembled, one edge of the restriction element 6 may be provided in the restriction slot 1456 of all the connecting rod engagement elements 145, while the other edge of the restriction element 6 may abut against the housing of the phase shifter assembly 3 on one end of the housing opening 31 of the phase shifter assembly 3, so that all the connecting rod engagement elements 145 can be positioned precisely in their zero positions at the same time very reliably.

In an embodiment according to the present disclosure, an edge portion of the restriction element 6 for being provided in the restriction slot 1456 of the engagement element 145 may have a configuration that matches the cross-section of the restriction slot 1456 of the engagement element 145, so as to ensure the precise positioning of the connecting rod engagement element 145.

In an embodiment according to the present disclosure, in order to further improve the adjustment accuracy of the transmission device 1, a diameter ratio of the worm gear 142 to the spur gear 144 may be greater than 1, for example, the diameter ratio of the worm gear 142 to the spur gear 144 may be 1.5. As such, a linear speed of the spur gear 144 may be lower than a linear speed of the worm gear 142, thereby improving the adjustment accuracy of the transmission device 1 by reducing an axial movement step of the connecting rod engagement element 145.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

The invention claimed is:

1. A transmission device for a base station antenna, comprising:

a motor;

a screw coupled to the motor;

a transmission shaft; and a linkage system coupled to the screw via the transmission shaft, such that the screw is configured to drive the linkage system via the transmission shaft, the linkage system comprises:

a worm coupled to the transmission shaft;

a worm gear meshed with the worm;

at least one spur gear disposed on a same connecting shaft as the worm gear; and at least one connecting rod engagement element, wherein the spur gear and the worm gear are fixedly disposed relative to each other and the connecting rod engagement element has a rack meshed with the spur gear, such that the worm is configured to drive the worm gear to rotate with the spur gear, and the spur gear is configured to drive the connecting rod engagement element via the rack to move in an axial direction of the transmission shaft, wherein an axis of rotation of the transmission shaft is coaxial to an axis of rotation of the screw, and wherein the worm has a shaft bore for connection with the transmission shaft, an inner surface of the shaft bore has a polygonal structure, the transmission shaft at least partially has a polygonal portion for embedding into the shaft bore, and the polygonal portion is configured to mate with the polygonal structure of the inner surface of the shaft bore to define the worm in a zero position when the transmission device is assembled.

2. The transmission device according to claim 1, wherein the connecting rod engagement element comprises a restriction slot configured to receive a restriction element when the transmission device is assembled, in order to position the connecting rod engagement element in the zero position.

3. The transmission device according to claim 1, wherein a diameter ratio of the worm gear to the spur gear is greater than 1.

4. The transmission device according to claim 1, wherein the shaft bore of the worm has a decagonal inner surface, and the polygonal portion of the transmission shaft has a decagonal outer surface that is configured to mate with the inner surface of the shaft bore of the worm.

5. The transmission device according to claim 1, wherein the polygonal portion extends over an entire axial length of the transmission shaft.

6. The transmission device according to claim 2, wherein the restriction slot extends transversely to a movement direction of the connecting rod engagement element.

7. The transmission device according to claim 1, wherein the transmission device comprises a plurality of connecting rod engagement elements configured to move synchronously with each other in the axial direction of the transmission shaft under driving of the spur gear.

8. The transmission device according to claim 3, wherein the diameter ratio of the worm gear to the spur gear is 1.5.

9. The transmission device according to claim 1, wherein the transmission device has even number of spur gears, and the even number of spur gears are mirrored on both sides of the worm gear with respect to the worm gear.

10. The transmission device according to claim 1, wherein the connecting shaft has a polygonal cross-section, and inner surfaces of shaft bores of the worm gear and the spur gear for receiving the connecting shaft each have a polygonal structure that is configured to mate with the cross-section of the connecting shaft, such that the spur gear is configured to rotate synchronously with the worm gear via the connecting shaft.

11. A transmission device for a base station antenna, comprising:

a motor;

a screw coupled to the motor;

a transmission shaft; and a linkage system coupled to the screw via the transmission shaft, such that the screw is configured to drive the linkage system via the transmission shaft, the linkage system comprises:

a worm driven by coupled to the transmission shaft;

a worm gear meshed with the worm;

a plurality of spur gears disposed on a same connecting shaft as the worm gear; and a plurality of connecting rod engagement elements, wherein the spur gears and the worm gear are fixedly disposed relative to each other and each of the connecting rod engagement elements has a rack meshed with a respective spur gear, such that the worm is configured to drive the worm gear to rotate with the spur gears, and the spur gears are configured to drive the connecting rod engagement elements via the rack to move in an axial direction of the transmission shaft, wherein each connecting rod engagement element comprises a restriction slot configured to receive an elongated restriction element when the transmission device is assembled, in order to simultaneously position each connecting rod engagement element in a zero position.

12. The transmission device according to claim 11, wherein each connecting rod engagement element comprises two connecting rod engagement half bodies, the rack is provided between the two connecting rod engagement half bodies and is configured to connect the two connecting rod engagement half bodies, each connecting rod engagement half body has two feet extending along a movement direction of the connecting rod engagement element, and the two feet extend away from each other from a region in which the rack is located.

13. The transmission device according to claim 12, wherein, in an assembly position of the connecting rod engagement element, the restriction slot is configured in a same position of a foot on a same side of each of all the connecting rod engagement half bodies.

14. The transmission device according to claim 11, wherein the worm has a shaft bore for connection with the transmission shaft, an inner surface of the shaft bore has a polygonal structure, the transmission shaft at least partially has a polygonal portion for embedding into the shaft bore, and the polygonal portion is configured to mate with the polygonal structure of the inner surface of the shaft bore to define the worm in the zero position when the transmission device is assembled.

15. The transmission device according to claim 11, wherein a diameter ratio of the worm gear to the spur gear is greater than 1.

16. A base station antenna, wherein the base station antenna comprises the transmission device according to claim 1.

17. A transmission device for a base station antenna, comprising:

a motor;

a screw coupled to the motor;

a transmission shaft; and a linkage system coupled to the screw via the transmission shaft, such that the screw is configured to drive the linkage system via the transmission shaft, the linkage system comprises:

a worm coupled to the transmission shaft;

a worm gear meshed with the worm;

at least one spur gear disposed on a same connecting shaft as the worm gear; and at least one connecting rod engagement element, wherein the spur gear and the worm gear are fixedly disposed relative to each other and the connecting rod engagement element has a rack meshed with the spur gear, such that the worm is configured to drive the worm gear to rotate with the spur gear, and the spur gear is configured to drive the connecting rod engagement element via the rack to move in an axial direction of the transmission shaft, wherein the worm has a shaft bore for connection with the transmission shaft, an inner surface of the shaft bore has a polygonal structure, the transmission shaft at least partially has a polygonal portion for embedding into the shaft bore, and the polygonal portion is configured to mate with the polygonal structure of the inner surface of the shaft bore to define the worm in a zero position when the transmission device is assembled, wherein the connecting rod engagement element comprises a restriction slot configured to receive a restriction element when the transmission device is assembled, in order to position the connecting rod engagement element in the zero position, and wherein each connecting rod engagement element comprises two connecting rod engagement half bodies, and the rack is provided between the two connecting rod engagement half bodies and is configured to connect the two connecting rod engagement half bodies.

18. The transmission device according to claim 17, wherein each connecting rod engagement half body has two feet extending in a movement direction of the connecting rod engagement element, and the two feet extend away from each other from a region in which the rack is located.

19. The transmission device according to claim 18, wherein the restriction slot is configured on at least one of the two feet.

20. The transmission device according to claim 19, wherein in an assembly position of the connecting rod engagement element, the restriction slot is configured in a same position of a foot on a same side of each of all the connecting rod engagement half bodies.

* * * * *